Sept. 27, 1966  J. N. DEMSEY, JR., ETAL  3,274,905
METHOD OF MAKING A COMPOSITE CONTAINER
Filed June 4, 1965

INVENTORS
John N. Demsey, Jr.
BY James A. Huber

Andrew H. Schmeltz
ATTORNEY

United States Patent Office 3,274,905
Patented Sept. 27, 1966

3,274,905
METHOD OF MAKING A COMPOSITE CONTAINER
John N. Demsey, Jr., Murrysville, Pa., and James A. Huber, Cleveland, Ohio, assignors to Aluminum Company of America, Pittsburgh, Pa., a corporation of Pennsylvania
Filed June 4, 1965, Ser. No. 461,397
5 Claims. (Cl. 93—94)

This invention relates to a method of making spirally wound composite metal foil-paper containers having body plies secured by means of a thermoplastic adhesive, and to the resulting product.

It is well known to manufacture spirally wound containers having one or more body plies of paper and one or more plies of metal foil by employing water-based animal glues, dextrin adhesives or emulsion adhesives to bond the various body plies. These adhesives present the distinct disadvantage of necessitating removal of moisture from the moisture absorbent paper body components in order to obtain suitable strength. In addition, the finished container has the undesirable characteristic of being susceptible to failure caused by moisture penetration.

It is an object of this invention to provide a method of making a spirally wound composite metal foil-paper container having the component plies continuously secured to each other by means of a dry bonding thermoplastic adhesive in order to provide complete bonding throughout the container wall.

It is another object of this invention to provide a method of making a spirally wound dry bonded composite metal foil-paper container having the component plies separated by continuous gas and moisture barriers.

It is yet another object of this invention to provide a dry bonded composite metal foil-paper container possessing uniformity of bond throughout and resultant improved strength.

These and other objects will be more fully understood and appreciated from the following description of the invention, on reference to the illustrations appended hereto, in which.

Figure 1:
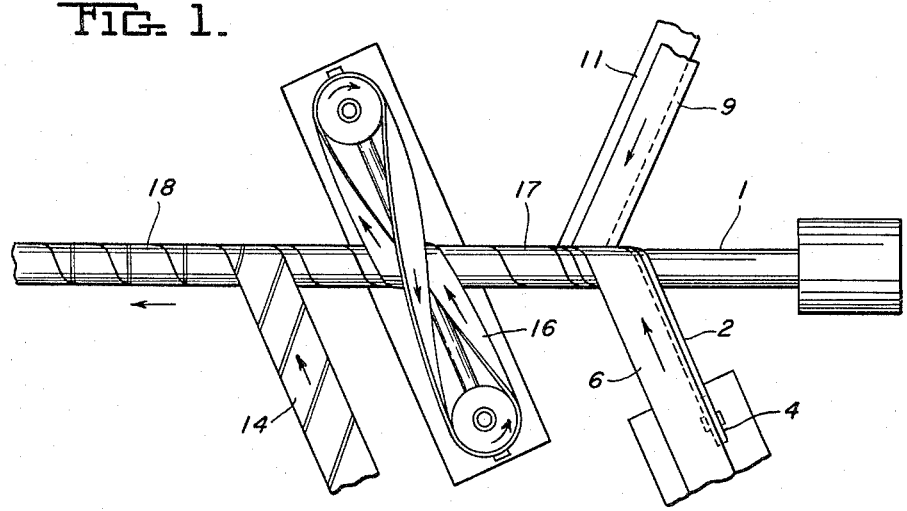
FIG. 1 is a schematic representation of a method of making a container embodying the concept of this invention.
Figure 3:
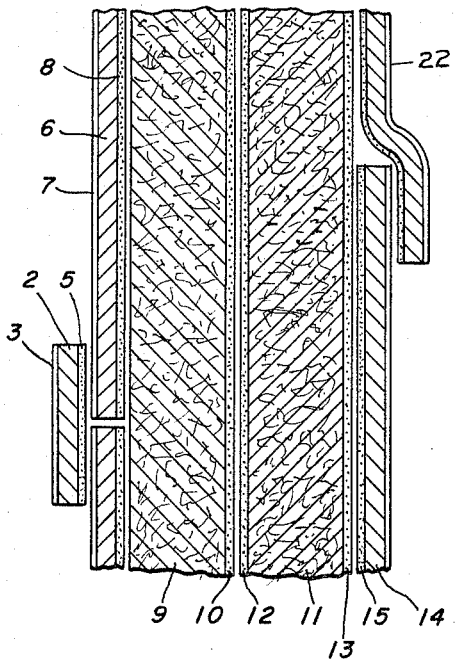
FIG. 3 is an enlarged sectional view taken on line 3—3 of FIG. 2 showing somewhat diagrammatically a segmented cross-section of the container wall.

A thermoplastic or heat activatable adhesive which is inactive and free from off-setting or blocking at normal temperatures, but becomes tacky and has adhesive properties at elevated temperatures, is employed to bond the various plies as wound and to seal the seams of the liner and label plies. The adhesive is co-extensive with the width of an adjoining structural ply, and for economic purposes is no thicker than required to form a continuous, overall bond between adjoining structural plies. Since the adhesive bonds when it becomes tacky and need not be placed into a liquid phase, as would be necessary with a hot melt, the danger of depositing adhesive material on the mandrel surface is avoided. Also, suitable ply stock is preferably pre-coated continuously across its width with the adhesive and in such widths that yield mass production economies. It is then slit to ply widths and thereafter placed in reel or coil form for convenient transport and unwinding. In addition to simplifying the method, this system insures uniform and overall distribution of the adhesive. Polyolefins, such as polyethylene and polypropylene, have been employed successfully. Other materials which may be employed are polyvinyl acetate, polyvinyl chloride and polyethylene polyterephthalate, for example. Since methods for bonding such materials to metal foil and to paper stock are well known, no description of them is necessary to an understanding of this invention. Temperature considerations such as the desired heat sealing temperature and whether there will be subsequent temperature increases during the processing and filling of the container, may affect the selection.

The composite container made by the method of this invention has one or more body plies of kraft paper, paperboard or a similar material. These plies provide the basic structural foundation for the container wall. As these materials absorb moisture and suffer resultant deterioration and loss of structural properties, it is essential that they be effectively sealed in order to preserve the integrity of the container.

A metallic foil liner ply, which in the preferred form of this invention is aluminum foil, is disposed inwardly of the body plies. The edges of adjacent wraps are suitably seamed. A metallic foil label ply, preferably aluminum foil, is disposed outwardly of the body plies with the edges of adjacent wraps suitably seamed.

While the foil liner and label plies will generally be unbacked, it is contemplated that it may become desirable, as where very thin foil is used, to add strength to the ply by pre-lamination with a backing of paper or other suitable material. The adhesive used for such purpose need not be of a thermoplastic nature. Foils having thickness of about 0.0005–0.001 inch and greater have been successfully employed without a supporting ply. Use of foil of about 0.00035 inch might make mounting preferable in a high speed operation. Whether mounting is desirable depends upon the particular use and factors such as winding speed and tension on the ply during winding must be considered. As foil of thinner gauge is not completely impermeable to moisture and gas and moisture causes paper to deteriorate, it is advantageous to use unbacked foil since the adhesive provides a barrier keeping moisture out of all paper plies. As a result of the manner in which this container is constructed, thin foil (less than 0.001 inch), which is generally considered to have pinholes and requires sealing, may be employed in both the liner and label plies. The substantially continuous coating or ply of thermoplastic adhesive effectively seals any pinholes and prevents entry of moisture or gases into or through the container wall from either the interior or exterior thereof. The use of paper backing may then be eliminated. As the use of thinner foil is facilitated by this invention, the container is made more economically. Only where the foil would be subjected to high tension during winding would paper backing become desirable.

Turning now to the embodiment of the invention selected for illustration, FIG. 1 schematically illustrates the preferred method of practicing this invention. An internally heated stationary mandrel 1, which may be heated by steam, water, electrical resistance or other convenient means, is adapted to receive the various plies to be wound. A foil tape or ribbon 2 having the internal surface provided with a slip coating 3, which imparts lubricity to the surface to facilitate free movement over the mandrel surface is unwound from reel 4. The exterior tape surface has a continuous or overall coating of a heat reactivatable adhesive 5. Approximately one-half of the tape 2 overlaps and is adhered to the trailing edge of liner ply 6. The liner ply has an interior surface slip coating 7 which is compatible with heat activatable adhesive coating 5. As the liner ply 6 is wrapped around the mandrel 1, the leading edge of the adjacent liner wrap will be sealed against the remaining exposed one-half of the tape, thereby creating a tape sealed butt seam of the abutting edges. The outer surface of the liner ply 6 is coated with a continuous or overall coating of polyolefin 8. Next, paperboard ply 9 having a continuous polyolefin coating 10 on its exterior surface, is wrapped over liner ply 6, but is longitudinally offset from liner ply 6 in order to avoid registry of seams between the two plies. Second body ply 11, having interior polyolefin coating 12 and exterior polyolefin coating 13, is wrapped over body ply 9 and longitudinally offset therefrom. It has been found that the attainment of a superior bond is facilitated by the use of both coatings 10 and 12 rather than a single coating of double thickness adhered to one of the plies. Finally, a metallic foil label ply 14, which is preferably aluminum foil, having an interior surface polyolefin coating 15 and an exterior decorative surface 22, is offset from body ply 11 and wound over this ply in such a manner as to provide a lap seam seal of the label ply 14. In order to effect a secure lap seam, it is necessary that the decorative surface 22 of the label ply 14 be compatible with polyolefin coating 15.

During winding, the various plies are under sufficient tension to insure the production of a uniform, tightly wound composite tube. As the various longitudinally offset plies are spirally wound on the mandrel, the mandrel heat is conducted outwardly through the plies thereby establishing a temperature gradient between the liner ply 6 and the label ply 14. As the bonding temperature of each polyolefin coating is reached, it becomes tacky and begins to continuously secure the plies to each other. An endless belt 16 provides bonding pressure for the adhesive securing the main body plies and may be located conveniently between the portion of the mandrel where the liner ply 6 is introduced to the mandrel and the portion of the mandrel where the label ply 14 reaches the mandrel. The belt is wrapped around the mandrel 1 and in addition to exerting pressure on the partially completed tube 17 causes longitudinal advancement of the tube. After the label ply 14 has been wrapped, the completed tube 18 is cooled, either by positive cooling means or by allowing it to gradually cool to ambient room temperature.

The tube 18 may be cut into manageable lengths for subsequent handling and later reduced to desired container lengths or cut directly into desired container lengths. The opposed openings in the tube 18 may be sealed by means of a pair of closure ends 19, 20 to provide completed container 21.

It will be appreciated that our invention provides a method of making a composite container having adjacent plies continuously and uniformly bonded in a heat sealed union by a thermoplastic adhesive. The method facilitates trouble-free handling of the adhesive as it may be pre-coated on the various plies which may then be stored on reels to await winding. Further, the continuity of the adhesive coating provides a coextensive and continuous moisture and gas barrier between each pair of adjacent plies, unlike containers wherein only the seams of the liner and label ply are sealed. Thus, the transmission of moisture or gas into the container wall, from either the container interior or exterior, is effectively prevented. In addition, all paper plies are independently sealed against such penetration into the plies and resultant weakening of the container wall. The multiplicity of continuous barriers also acts to eliminate interply differential pressures caused by seepage and resultant blister formation.

Within the framework of the invention as exemplified by the foregoing discussion of the preferred form, numerous modifications may be made. The inwardly taped liner butt seam discussed above is the type disclosed in U.S. Patent 3,147,902 but its use is not essential to the invention. Suitably sealed lap seam joints, folded seam joints or foil tapes externally sealing a liner butt joint, for example, may be employed in lieu of the butt seam illustrated. Regardless of the method of seaming, a tubular metallic foil liner is created. Similarly, the seam of the label ply need not be a lap seam and any means of providing a suitable seam compatible with the decor of the label ply is acceptable.

Figure 2:
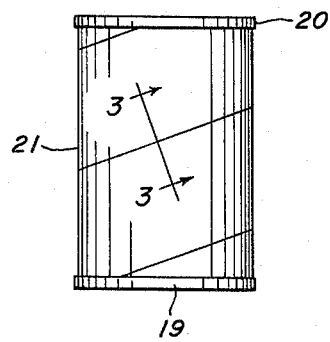
FIG. 2 is an elevational view of a container constructed in accordance with the teaching of this invention.

While the preferred method involves pre-adhering the thermoplastic adhesive to the various plies prior to winding the plies, the adhesive may be introduced in other ways. It may, for example, be fed as a distinct ply from a separate reel or directly from the extruder. Also, while FIG. 2 shows body ply members 9 and 11 as having adhesive coatings 10 and 12 respectively, either coating 10 or coating 12 of proper thickness to suitably bond the plies may be employed alone. Although it is a preferred method of securing the two plies, it is not essential that the opposed faces of both plies be independently coated. In like manner either coating 13 or 15 may be eliminated.

While for purposes of illustration of container having two paperboard plies has been shown, it is obvious that while at least one paperboard ply is needed, any number of plies may be employed. The number used and the thickness of each ply will depend upon the overall container wall strength and thickness desired.

While heating by means of an internally heated mandrel has been discussed for purposes of illustration, it is obvious that external heating sources may be employed either in lieu of or in addition to the heated mandrel. In fact, external heating may be provided just prior to mandrel contact, followed by winding on an internally and/or externally cooled mandrel.

While specific reference has been made to the use of aluminum foil, the invention is not so limited. Other metallic foils, such as steel, for example, may be substituted for either the liner ply or label ply or both.

Whereas particular embodiments of the invention have been described above for purposes of illustration, it will be evident to those skilled in the art that numerous variations of the details may be made without departing from the invention as defined in the appended claims.

We claim:

1. In a method of making a composite metallic foil-paper container, the steps comprising:
   (a) spirally winding a metallic foil liner ply over an elongated mandrel;
   (b) spirally winding a longitudinally offset paperboard ply over said liner ply with a continuous and co-extensive layer of thermoplastic adhesive interposed between said liner ply and said paperboard body ply; and
   (c) continuously bonding said plies by elevating the temperature of the composite wrap to the heat sealing temperature of said adhesive.

2. The method of claim 1 wherein the thermoplastic adhesive is polyolefin and each ply has at least one surface pre-coated with a continuous layer of said adhesive.

3. In a method of making a dry bonded composite metallic foil-paper container, the steps comprising:
   (a) spirally winding an aluminum foil liner ply over an elongated stationary mandrel;
   (b) spirally winding at least one longitudinally offset paperboard body ply over said liner ply;
   (c) spirally winding an aluminum foil label ply over the outermost paperboard body ply with a continuous and co-extensive overall layer of thermoplastic adhesive interposed between each successive pair of said plies; and
   (d) bonding said plies by elevating the temperature of said adhesive to the heat sealing temperature of said adhesive and subsequently reducing the temperature to below said heat sealing temperatures, whereby a continuous and co-extensive overall moisture and gas barrier is established between each successive pair of plies.

4. The method of claim 3 wherein the thermoplastic adhesive is polyolefin and each ply has at least one surface pre-coated with a continuous overall layer of said adhesive.

5. In a method of making a composite metallic foil-paper container, the steps comprising:
   (a) spirally winding a metallic foil liner ply over an elongated mandrel;
   (b) spirally winding a continuous and coextensive ply of thermoplastic adhesive, elevated to the heat sealing temperature, over said liner ply;
   (c) spirally windingly a longitudinally offset paperboard ply over said adhesive ply; and
   (d) bonding said plies by applying pressure to the outer surface of said paperboard ply.

References Cited by the Examiner

UNITED STATES PATENTS

| | | | |
|---|---|---|---|
| 2,250,430 | 7/1941 | Wade | 93—80 |
| 2,858,057 | 10/1958 | Mullinix | 229—4.5 |
| 2,898,025 | 8/1959 | Walker | 229—4.5 |
| 2,982,457 | 5/1961 | D'Alelio | 229—3.5 |
| 3,015,596 | 1/1962 | Couch et al. | 229—3.1 |
| 3,036,503 | 5/1962 | Geist | 93—94 |
| 3,064,544 | 11/1962 | Stark | 93—94 |
| 3,157,336 | 11/1964 | Elam | 229—4.5 |
| 3,159,515 | 12/1964 | Dunlap et al. | 93—94 X |
| 3,162,347 | 12/1964 | Taylor | 229—4.5 |
| 3,165,985 | 1/1965 | Pottle | 93—94 |
| 3,183,802 | 5/1965 | Rutledge | 93—80 |

BERNARD STICKNEY, *Primary Examiner.*

JOSEPH R. LECLAIR, *Examiner.*

D. T. MOORHEAD, *Assistant Examiner.*